United States Patent [19]
Helgorsky et al.

[11] 3,971,843
[45] July 27, 1976

[54] PROCESS FOR LIQUID/LIQUID EXTRACTION OF GALLIUM

[75] Inventors: Jacques Helgorsky, Frepillon; Alain Leveque, Paris, both of France

[73] Assignee: Rhone-Poulenc Industries, Paris, France

[22] Filed: July 3, 1975

[21] Appl. No.: 592,884

[30] Foreign Application Priority Data

July 12, 1974 France .............................. 74.24263
Apr. 10, 1975 France .............................. 75.11200
Apr. 16, 1975 France .............................. 75.11797

[52] U.S. Cl. .............................. 423/112; 423/181; 75/101 BE
[51] Int. Cl.² ...................... C01G 15/00; C01F 7/02
[58] Field of Search ................. 423/112, 181, 658.5; 75/101 BE

[56] References Cited
UNITED STATES PATENTS 3,637,711   1/1972   Budde et al. .......................... 60/289
3,887,681   6/1975   De La Breteque et al. ........ 423/112

OTHER PUBLICATIONS

Stany et al., "The Solvent Extraction of Metal Chelates," Pergamon Press, N.Y., 1964, pp. 80–86.

*Primary Examiner*—Herbert T. Carter
*Attorney, Agent, or Firm*—McDougall, Hersh & Scott

[57] ABSTRACT

The recovery of gallium present in aqueous solution which may also contain a compound of aluminum and sodium, in which the aqueous solution is contacted with a substituted hydroxyquinoline in solution in an organic solvent immiscible with water and under highly alkaline conditions whereby gallium and sodium and aluminum, when present, go into the organic phase, and in which the gallium can be separated from the sodium and aluminum by contacting the organic phase with a concentrated dilute solution of an inorganic acid to remove sodium and aluminum from the organic phase and then contacting the remaining organic phase with a more concentrated solution of inorganic acid to remove the gallium.

12 Claims, No Drawings

PROCESS FOR LIQUID/LIQUID EXTRACTION OF GALLIUM

The invention relates to a process of liquid/liquid extraction of gallium contained in very basic solutions and more particularly in solutions of sodium aluminate from the Bayer process.

Gallium is known to be present in bauxites in contents varying from 0.002 to 0.01%, corresponding to Al/Ga ratios of 8000 to 3000/1. In the course of the Bayer cycle for producing alumina, gallium is also known to concentrate progressively in the sodium aluminate solutions until an equilibrium is reached with the Al/Ga ratio of the solutions at approximately 400 to 150/1. The sodium aluminate solutions, which are available in very large quantities, are thus a first-class raw material for gallium in cases where industrial quantities are required, since there is no ore of this metal.

There are several well known methods of treating aluminate solutions such as fractionated carbonation or causticization. These enable the gallium to be further concentrated relative to the aluminum, up to strengths at which extraction, e.g. by electrolysis, will yield gallium. These processes have many drawbacks, the main one being that the solutions are spoiled and cannot then be recycled in the Bayer circuit. Such processes cannot therefore be used industrially if large quantities of gallium have to be produced, which would involve treating a high proportion of the aluminate solutions circulating in an alumina producing unit.

Two methods have been proposed, which do not spoil the aluminate solutions and which are based on amalgamating the gallium. The reaction is carried out either by directly electrolyzing the solutions over a vigorously agitated mercury cathode or by exchanging them with amalgams of metals which are more electropositive than gallium. However, the very negative potential, which is necessary for gallium to be deposited, leads to parasitic reactions whereby impurities in the solution, e.g. vanadium, are reduced. Moreover, because of the poor solubility of gallium in mercury, such processes suffer from the fact that large stocks of mercury have to be carried, a very substantial amount of that metal is lost relative to the gallium produced, and finally mercury is difficult to handle and special safety measures have to be taken if it is used.

Because of these disadvantages, a great deal of research has been carried out with a view to perfecting industrial processes for recovering the gallium present in aluminate solutions by liquid/liquid exchange, without change in the solutions. This obviously eliminates the well known methods whereby gallium is extracted in an acid medium.

The aluminate solutions from the Bayer process are described as "decomposed" when the alumina has been precipitated. The composition of the decomposed solutions corresponds approximately to the following concentrations: $Na_2O$ 160 g/l, $Al_2O_3$ 80 g/l, Ga 200 to 240 mg/l. These solutions are thus very basic; the concentration of OH ions is of the order of 3 moles/l and aluminum and gallium are present in the form of aluminate and gallate anions which can be expressed as $Al(OH)_4^-$ and $Ga(OH)_4^-$; however no known complex-forming agent is effective or selective enough to fix the $Ga(OH)_4^-$ anions in the presence of large quantities of $Al(OH)_4^-$ anions and hydroxyl ions $OH^-$.

On the other hand, some cationic complex-forming agents have an affinity for trivalent $Ga^{3+}$ ions strong enough to make the resulting complexes stable even in a very basic medium, whereas similar complexes formed with aluminum show far less stability under the same conditions. Furthermore, these complexes are soluble in some organic solvents which do not mix with water, and it is then possible to use the complex-forming reagents to recover the gallium from aluminate solutions by liquid/liquid extraction.

On this basis, two processes have been proposed, in which the cationic complex-forming agents are oxine (8-hydroxyquinoline) with chloroform used as solvent, or β-diketones and more particularly acetylacetone with isobutanol or benzene used as solvent. The processes do have disadvantages however, for the stability of the complexes obtained and consequently the extraction yield are found to diminish when the pH of the aqueous phase increases due to the formation of $Ga(OH)_4^-$ anions. This necessitates using large quantities of complex-forming agent if an adequate amount of gallium is to be extracted at the very alkaline pH's corresponding to those of industrial aluminate solutions. Moreover the coefficient of division of the complex-forming agents between the solvents used and the aqueous phase is relatively low and falls further the more the pH increases. For example, the coefficient of division of oxine between chloroform and water is 730/1 at pH 7 but only unity at pH 12; similarly with acetylacetone, the coefficient of division between benzene and water is 5.8/1 at pH 7 but only unity at pH 9.7. Parallel with the extraction of gallium in the organic phase and whatever the conditions may be, a variable fraction of the excess complex-forming agent will therefore pass into the aqueous phase in the form of sodium salt and thus be wasted. The wastage of complex-forming agent and the resultant change in the nature of the aluminate solutions make such extraction processes unsuitable for industrial use.

Substituted hydroxyquinolines have been known for a long time. More recently some of these have been recommended as cation exchangers for extracting various metals, particularly copper, in the state of complexes within a wide pH range, e.g. from 1 to 7. Some of the substituted hydroxyquinolines are insoluble in even a highly basic medium and soluble in many organic solvents such as aliphatic or aromatic hydrocarbons which may be halogenated; complexes of these hydroxyquinolines with the metals which have to be extracted are also soluble in such solvents.

The method of the invention comprises extracting gallium, possibly in the presence of large quantities of aluminum, and in a very highly basic aqueous medium, such as the sodium aluminate solutions from the Bayer process, by means of such substituted hydroxyquinolines. It has unexpectedly been found that such hydroxyquinolines, diluted with solvents for the hydroxyquinolines, enable nearly all the gallium present to be extracted despite the simultaneous extraction of sodium and aluminum which results from the high concentrations of these two metals in the aqueous medium. The amount of sodium and aluminum extracted is nevertheless very small relative to the quantities of sodium and aluminum present in the solutions treated.

The gallium in the complex-forming agent is generally recovered by strong acids in known manner. In this case however, it is more advantageous to exploit the great differences in stability which are observed in a slightly acid medium between gallium complexes and complexes of the other metals. The gallium can undergo initial purification, by using a concentration of acid which is sufficient to make the aluminum and sodium retained by the complex-forming agent pass back into the aqueous phase but insufficient to make large quantities of gallium pass back into the aqueous phase. The complex-forming agent should then be treated again with a more concentrated acid in order to recover all the gallium. This two-stage recovery has the additional advantage of eliminating a certain number of metallic impurities from the aluminate solutions, such as zinc, lead and cobalt, which may pass into the organic phase but will pass back into the aqueous phase when the complex-forming agent receives its first treatment with a dilute acid. In practice, a strong acid of a concentration of about 0.5 N will be sufficient for the first operation, while a concentration of about 2 N will be necessary for the second. As the gallium is usually required in the form of its chloride ($GaCl_3$) for the sake of the treatment which follows, it is preferable to use hydrochloric acid. However, special care then has to be given to the concentration of acid for the second operation. If the concentration is too high it will encourage the anionic complex $GaCl_4^-$ to form; this will be retained by the complex-forming agent, which will then operate as an anion exchanger because of the nitrogen atom present in its molecule.

It is also helpful, as a means of improving the purification of gallium, to exploit the formation of such anionic complexes of gallium with hydrochloric acid as well as with other acids such as hydrobromic. For this purpose the organic phase, with the complex-forming agent charged with various metals, should first be treated with strong acids. These should be used in concentrations high enough to keep the gallium dissolved in the organic phase but to allow the aluminum, sodium and various metals to be virtually totally extracted. The gallium can then be recovered by treating the thus purified organic phase with strong acids which are more dilute. For industrial purposes, the acid to be used for the first treatment is preferably hydrochloric acid, preferably in a concentration of over 5 N; the second treatment should preferably also be given with hydrochloric acid in order to obtain gallium in the form of $Ga\ Cl_3$. The concentration of the acid should be about 1.5 N, since a lower concentration would not allow sufficient metal to be recovered.

Finally, in the manner known from extractions carried out with substituted hydroxyquinolines, it may be advantageous to add substances with an alcohol function, such as various heavy alcohols and heavy phenols, and various other solvating compounds such as certain phosphoric esters, as well as the solvent, in the organic phase of extraction. In some cases such additions have a favorable effect on the gallium/aluminum and gallium/sodium separation factors.

The concentration of substituted hydroxyquinolines in the organic phase need not be very high. Even with a concentration of 2% a considerable amount of gallium can be extracted, since the complex-forming agents have far greater affinity for gallium than for aluminum and sodium. In practice, however, concentrations of about 10% are more favorable and enable most of the gallium to be extracted.

In practice, a substituted hydroxyquinoline which is well suited to the purpose is 7 (5,5,7,7-tetramethyl 1-octene- 3-yl) 8-hydroxyquinoline, represented by the formula:

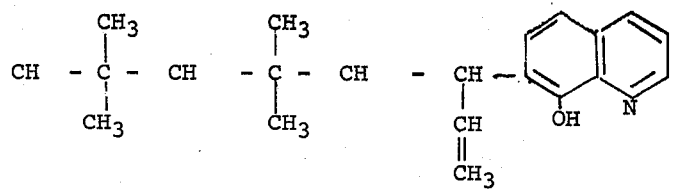

This is the active substance in the products sold under the name of KELEX 100 and KELEX 120 by Ashland Chemical.

This compound is not only soluble in the organic solvents indicated above, in addition it forms complexes with the extracted metals, which are also highly soluble in the same solvents, as is required for industrial liquid/liquid extraction.

Other substituted hydroxyquinolines with the same properties would be equally suitable. In practice these are the ones where the total number of carbon atoms in the substituents is adequate, e.g. at least 8.

In industrial practice, the installations which have to be used are conventional and are laid out as follows. The sodium aluminate solution, containing a reduced quantity of alumina following its "decomposition", and the organic phase, comprising the selected complex-forming agent, a solvent and possibly substances with an alcohol function and other solvating compounds, are fed into a first counter-current extraction apparatus. A large portion of the gallium then passes into the organic phase, the proportion depending on the respective flow rates of the two liquids. Aluminum, sodium, and some impurities also pass into the organic phase. In another extracting apparatus the organic phase thus charged is brought into contact with a first regenerating solution, comprising a strong dilute acid or a strong, complex-forming, concentrated acid, so that in either case virtually only the gallium is left in the organic phase. The organic phase is then treated in a third counter-current extracting apparatus, where it is brought into contact with a strong acid in order to recover the gallium and is then washed with water before being recycled to the first counter-current extracting apparatus. The acid solution used to recover the gallium is then treated to complete its purification, then the gallium is extracted from it, all by known methods.

Slight alterations can obviously be made to the above-mentioned processes. For example, varying some parameters such as temperature will not produce any great change in the results obtained. However it has been found particularly advantageous for extraction by the organic phase to take place at a temperature which is fairly high and yet compatible with apparatus which can currently be used and compatible with moderate evaporation of the solutions, while the recovery of the gallium in the organic phase by strong acids should take place at a more moderate temperature. The speed of extraction has, in fact, been found to increase with temperature, which means that very high extraction rates can be obtained for the gallium with reduced contact times, whereas the amount of gallium recovered by the strong acids decreases under the same conditions. In practice, temperatures below 100°C are suitable for extraction by the organic phase and temperatures in the region of 80°C are particuarly appropriate.

In industrial practice, however, the solutions to be treated are aluminate solutions from the Bayer process and particularly so-called "decomposed" solutions which are at about 50°C. Although this temperature is less favorable than a higher one, it is nevertheless sufficient to give satisfactory yields. As far as the treatment of the organic phase by strong acids is concerned, cooling to about ambient temperature is sufficient to obtain very high recovery rates for the gallium.

It should be pointed out that the amount of gallium required is considerably less than the amount contained in all the sodium aluminate solutions circulating in an alumina production unit of present day industrial size. This means that only a small proportion of the solutions need be treated regularly, because of the very good recovery of gallium. The loss of aluminum, resulting from its extraction by the first acid solution for regenerating the organic phase, is relatively small and can be ignored. Obviously the loss of aluminum increases in proportion with the quantity of gallium recovered from the aluminate solutions, and it may be helpful from the economic point of view to recycle the acid solution for the recovery of the aluminum.

Examples will now be given to illustrate the various aspects of the invention.

EXAMPLE 1

100 ml of an 8% solution of KELEX 100 in kerosene is combined with 100 ml of decomposed aluminate solution from the Bayer cycle containing 166 g of $Na_2O$, 81.5 g of $Al_2O_3$ and 240 mg of Ga per liter. The mixture is agitated to obtain equilibrium and the phases are separated, after which the concentrations per liter are:

in the organic phase Ga : 148 mg, $Al_2O_3$ : 2.5 g, $Na_2O$ : 1 g in the aqueous phase Ga : 92 mg, $Al_2O_3$ : 79 g, $Na_2O$ : 165 g In a single operation, the organic phase thus extracts 61.5% of the gallium, and the Al/Ga ratio passes from 180 in the initial solution to 9 in this phase. Moreover the solution loses only a very small quantity of sodium (0.6%) and aluminum (3%).

This experiment clearly shows the importance of the process as far as the proportion of gallium extracted is concerned, as well as the small quantities of aluminum which are carried away with it.

EXAMPLE 2

A series of extracting operations are carried out as in Example 1 and with the same aluminate solution, using a different composition for the organic phase in each experiment of the series. The organic phase always contains 8% of KELEX 100 but variable quantities of 1-decanol are added to the kerosene. A proportion of 10% of the heavy alcohol is found to be most favorable to the extraction of gallium, for in this case when equilibrium has been reached the concentrations per liter in the organic phase are:

Ga : 197 mg, $Al_2O_3$ : 2 g, $Na_2O$ : 1.4 g.

This corresponds to 82% extraction of the gallium contained in the aluminate solution, which is very much higher than the rate obtained in the first example. At the same time less aluminum is extracted than in the first example, the Al/Ga ratio here being 5.4/1.

EXAMPLE 3

The gallium contained in the organic phase is recovered as in Example 2 but in two stages.

In the first stage, after being agitated with 100 ml of 0.6 N hydrochloric acid, the organic phase contains per liter:

Ga : 197 mg, $Al_2O_3$ : 0.02 g.

The Al/Ga ratio thus passes from 5.4 to 0.05/1.

In the second stage, after agitation with 100 ml of 2 N hydrochloric acid, no more aluminum is found in the organic phase. The concentration of gallium in the organic phase is then below 2 mg/l, which represents a recovery rate of over 99% for the gallium previously extracted from the aluminate solution.

EXAMPLE 4

This example concerns the recovery of gallium from an organic phase used to extract the gallium from a sodium aluminate solution from the Bayer process, by first treating the organic phase with a strong, complex-forming, concentrated acid.

An organic phase consisting of 8% of KELEX 100 and 92% of a 90/10 mixture of kerosene and decanol, after being agitated with a sodium aluminate liquor containing gallium, is found to contain per liter:

Ga : 186 mg, $Al_2O_3$ : 2.2 g, $Na_2O$ : 2.9 g.

In the first stage, after agitation with an equal volume of a 5.8 N hydrochloric acid solution, these concentrations become Ga : 186 mg, $Al_2O_3$ : 8 mg, $Na_2O$ : 10 mg.

In the second stage, after agitation with an equal volume of a 1.6 N hydrochloric acid solution, all the metals present are extracted. This represents substantially complete recovery of the gallium previously extracted from the aluminate solution and an excellent degree of purification, since the Al/Ga ratio is then below 0.025/1.

EXAMPLE 5

This example is designed to show the importance of using optimum temperatures for extracting and recovering gallium.

An industrial solution of sodium aluminate containing 190 g of $Na_2O$, 100 g of $Al_2O_3$ and 240 mg of gallium per liter is treated, under the same conditions of agitation, at temperatures of 20°, 50° and 80°C for periods of half an hour, one hour and 2 hours with an equal volume of an organic phase consisting of 8% of KELEX 100 and 92% of a 90/10 mixture of kerosene and decanol. The gallium extraction rates are given in the table below.

TABLE

| Temperatures | ½ hr. | 1 hr. | 2 hrs. |
| --- | --- | --- | --- |
| 20°C | 13% | 22% | 26% |
| 50°C | 56% | 76% | 80% |
| 80°C | 70% | 80% | 80% |

Gallium is then recovered from the organic phases which are richest in gallium by agitating for one hour with a 2 N hydrochloric acid solution, say at 80°C and after cooling to 20°C. At 80°C the amount of gallium recovered is found to be only 20% of the amount contained in the organic phases, whereas at 20°C it is over 95%.

It should be noted that the extraction rates given in this example are only for purposes of comparison. They depend greatly on operating conditions and on the apparatus used and can be increased in industrial practice. As used in the specification and claims, the terms gallium, sodium and aluminum, as well as other named metals are intended to include compounds of such metals.

We claim:

1. The process for the recovery of gallium present as a compound in solution in aqueous alkaline solutions which also contain compounds of aluminum and sodium in solution comprising contacting the aqueous solution with a water-insoluble, organic solvent-soluble substituted hydroxyquinoline in solution in a water immiscible organic solvent selected from the group consisting of halogenated and unhalogenated aliphatic and aromatic hydrocarbons whereby gallium and some of the sodium and aluminum values transfer from the aqueous phase into the organic phase, separating the organic phase from the aqueous phase, contacting the organic phase with a dilute aqueous solution of an inorganic acid to remove sodium and aluminum to the aqueous phase, leaving gallium values in solution in the organic phase, separating the organic phase from the aqueous phase, and then contacting the remaining organic phase with an aqueous solution of a more concentrated inorganic acid to remove gallium values from the organic phase to the aqueous phase, and then separating the gallium values from the aqueous phase.

2. The process as claimed in claim 1 in which the aqueous solution is a sodium aluminate solution derived from the production of alumina by the Bayer process.

3. The process as claimed in claim 1 in which an alcohol is added to the organic phase.

4. The process as claimed in claim 1 in which the sum of the carbon atoms in the substituents of the substituted hydroxyquinoline is at least 8.

5. The process as claimed in claim 1 in which the substituted hydroxyquinoline is 7 (5,5,7,7-tetramethyl 1-octene 3-yl) 8-hydroxyquinoline having the formula

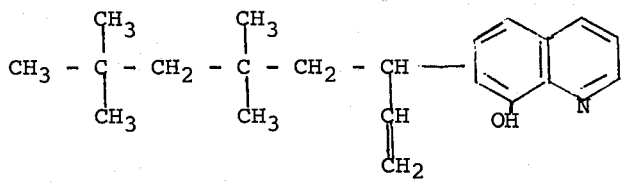

6. The process as claimed in claim 1 in which the amount of substituted hydroxyquinoline in the organic phase is approximately 10% by weight.

7. The process as claimed in claim 1 in which the extraction by the organic phase is carried out at a temperature below 100°C.

8. The process as claimed in claim 7 in which the temperature of extraction is within the range of 50°-80°C.

9. The process as claimed in claim 1 in which the treatment of the organic phase with the more concentrated solution of the inorganic acid to recover gallium is carried out at a temperature below the temperature used for extraction of the aqueous solution by the organic phase.

10. The process as claimed in claim 9 in which the temperature is about ambient temperature.

11. The process for the recovery of gallium present as a compound in solution in aqueous alkaline solution which also contains compounds of aluminum and sodium in solution comprising contacting the aqueous solution with a water insoluble, organic solvent soluble substituted hydroxyquinoline in solution in a water immiscible organic solvent selected from the group consisting of halogenated and unhalogenated aliphatic and aromatic hydrocarbons whereby gallium and some of the sodium and aluminum values transfer from the aqueous phase into the organic phase, separating the organic phase from the aqueous phase, contacting the organic phase with a concentrated aqueous solution of a strong inorganic acid capable of complexing the gallium values in anionic form, which will remain in solution in the organic phase, while sodium and aluminum values transfer to the aqueous phase, separating the organic phase from the aqueous phase, and then contacting the organic phase with a dilute aqueous solution of inorganic acid to remove gallium values from the organic phase to the aqueous phase, and then separating the gallium values from the aqueous phase.

12. The process as claimed in claim 11 in which the strong, complex forming acid is hydrochloric acid.

* * * * *